(12) United States Patent
Kobayashi et al.

(10) Patent No.: US 8,405,704 B2
(45) Date of Patent: Mar. 26, 2013

(54) TV CONFERENCE APPARATUS

(75) Inventors: Osamu Kobayashi, Tokyo (JP);
Norikazu Hagiya, Tokyo (JP);
Terumasa Takahashi, Tokyo (JP)

(73) Assignee: NEC Engineering Ltd., Tokyo (JP)

( * ) Notice: Subject to any disclaimer, the term of this patent is extended or adjusted under 35 U.S.C. 154(b) by 1582 days.

(21) Appl. No.: 11/860,895

(22) Filed: Sep. 25, 2007

(65) Prior Publication Data

US 2008/0079800 A1     Apr. 3, 2008

(30) Foreign Application Priority Data

Sep. 29, 2006   (JP) .................................. 2006-266303

(51) Int. Cl.
*H04N 7/14*        (2006.01)
(52) U.S. Cl. .................................. 348/14.09; 348/14.07
(58) Field of Classification Search ..... 348/14.01–14.16
See application file for complete search history.

(56) References Cited

U.S. PATENT DOCUMENTS

| | | | | |
|---|---|---|---|---|
| 5,657,096 A * | 8/1997 | Lukacs | ......................... | 348/585 |
| 6,554,238 B1 * | 4/2003 | Hibberd | ..................... | 248/278.1 |
| 6,639,623 B2 * | 10/2003 | Howell et al. | ................... | 348/61 |
| 6,695,270 B1 * | 2/2004 | Smed | ......................... | 248/274.1 |
| 6,899,442 B2 * | 5/2005 | Howell et al. | ................. | 362/147 |
| 7,092,001 B2 * | 8/2006 | Schulz | ....................... | 348/14.05 |
| 7,136,282 B1 * | 11/2006 | Rebeske | .................. | 361/679.55 |
| D563,917 S * | 3/2008 | Kobayashi et al. | .......... | D14/127 |
| 7,397,495 B2 * | 7/2008 | Girish et al. | ............... | 348/14.01 |
| 7,800,648 B2 * | 9/2010 | Lu et al. | ..................... | 348/207.1 |
| D634,745 S * | 3/2011 | Park et al. | .................... | D14/373 |
| 2010/0118112 A1 * | 5/2010 | Nimri et al. | ................ | 348/14.08 |

FOREIGN PATENT DOCUMENTS

| | | |
|---|---|---|
| JP | 04-122186 | 4/1992 |
| JP | 06-078185 | 3/1994 |
| JP | 8-298651 | 11/1996 |
| JP | 10-164540 | 6/1998 |
| JP | 10-178624 | 6/1998 |
| JP | 2000-187446 | 7/2000 |
| JP | 2002-533777 | 10/2002 |
| JP | 2002-534009 | 10/2002 |
| JP | 2004-228737 | 8/2004 |
| JP | 2005-094713 | 4/2005 |
| JP | 2005-184386 | 7/2005 |

\* cited by examiner

*Primary Examiner* — Fan Tsang
*Assistant Examiner* — Phylesha Dabney
(74) *Attorney, Agent, or Firm* — Young & Thompson

(57) ABSTRACT

A TV conference apparatus includes a main body, a plurality of monitors, arms for connecting the monitors to the main body such that they are free to turn about a vertical axis, and a camera disposed to an upper portion of the main body to pick up an image of an entire circumference. The plurality of monitors and the camera are disposed integrally with the main body. The TV conference apparatus can switch a first state, in which the plurality of monitors are disposed forward of the main body in line with each other, with a second state, in which the plurality of monitors are disposed sideward of the main body.

7 Claims, 13 Drawing Sheets

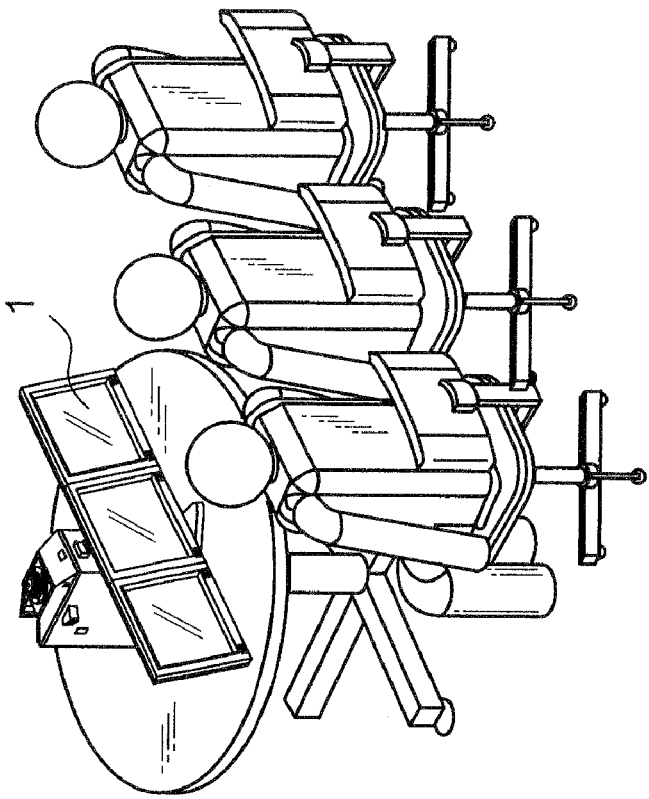
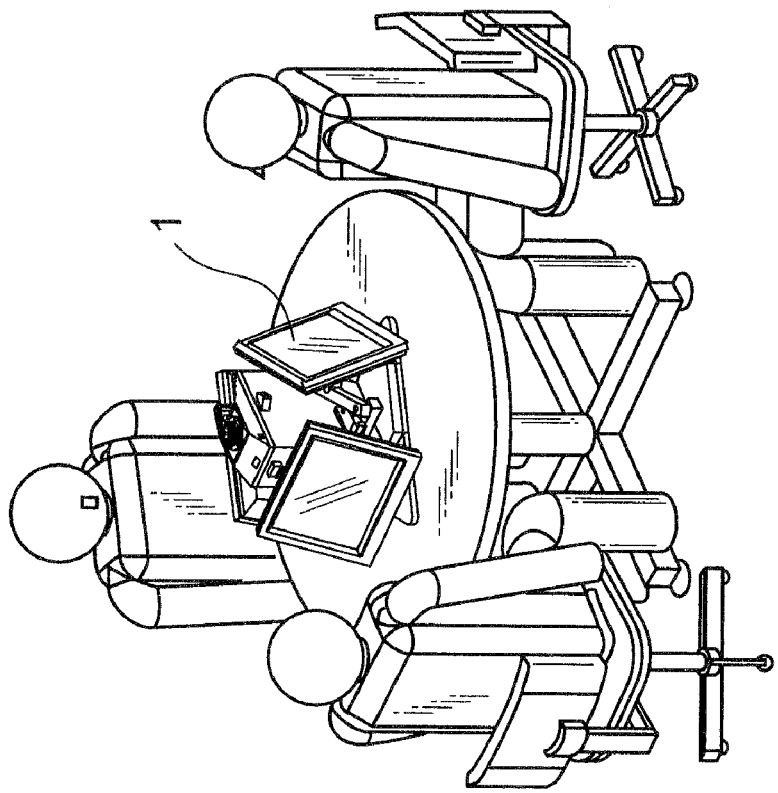
FIG. 10A
FIG. 10B

TV CONFERENCE APPARATUS

This application is based upon and claims the benefit of priority from Japanese patent application No. 2006-266303, filed on Sep. 29, 2006, the disclosure of which is incorporated herein in its entirety by reference.

BACKGROUND OF THE INVENTION

The present invention relates to a TV conference apparatus used to a TV conference system, and, more particularly, to a TV conference apparatus capable of easily changing a conference style and a conference place as well as grasping the condition of all the conference participants and the atmosphere and the like in a conference room.

TV conference systems are widely used to carry out a conference by connecting at least two conference rooms located at separate positions through a communication network and transmitting and receiving images and voices of conference participants between the conference rooms.

FIG. 1 shows a typical example of a TV conference system according to a related art. The TV conference system 100 includes a TV conference apparatus 101 connected to other TV conference apparatus through a communication network 120, a camera (TV camera) 102 connected to the TV conference apparatus 101 through cable 110a, 110b, and the like, a microphone 103, and a monitor 104. In the TV conference system 100, images of conference participants 105a to 105h picked up by the camera 102 and voices of them collected by the microphone 103 are transmitted to the TV conference apparatus of the other conference room through the TV conference apparatus 101. At the same time, the picked-up images and the collected voices transferred from the TV conference apparatus of the other conference room are output from the monitor 104 and a speaker built in the monitor 104. With this operation, images and voices of the conference participants are transmitted and received between the conference rooms.

In the TV conference system arranged as described above, the respective conference participants 105a to 105h in conference room get on with the conference while grasping the situation of the other conference room through the monitor 104. At the time, since the image picked up by the camera is a monotonous image vaguely showing the situation of the other conference room in an opposite (or counterpart) station, the image lacks a feeling of actually participating in a conference. Accordingly, the TV conference apparatus of the related art has a tendency that it is difficult to obtain a sense of identity among all the conference participants.

A patent document D1 (Japanese Unexamined Patent Application Publication No. 2005-184386) proposes a TV conference apparatus including a plurality of cameras, a picked-up signal selection section for selectively outputting a plurality of picked-up signals output from the plurality of cameras, a plurality of microphones, and a microphone selection section for specifying a speaker by detecting the direction from which a voice is generated based on the voices collected by the plurality of microphones. In the TV conference apparatus, the microphone that collects the voice of the speaker is selected from the plurality of microphones as well as the image that picks up the speaker is selected from the plurality of picked-up signals, and the image is transmitted to a conference room of an opposite station. With this operation, a TV conference system capable of providing a feeling of actually participating in a conference can be realized.

Further, a patent document D2 (Japanese Unexamined Patent Application Publication No. 8-298651) proposes a TV conference system which prevents a monotonous image and provides a feeling of actually participating in a conference by transmitting an image in which only a speaker is picked up, an image in which the speaker and the persons in the vicinity of the speaker are picked up, and an image in which all the conference participants are picked up, and the like to a conference room of an opposite station while arbitrarily switching these images by changing the image pickup range of a camera based on a specific image representation algorithm.

Incidentally, when a TV conference system is used, a conference is not always held in a conference style in which conference participants surround a rectangular table as shown in FIG. 1. That is, the conference may be held in other conference style such as a style in which it is held using a round table surrounded by conference participants. Thus, the sitting positions and directions of the conference participants are not always the same. Further, since the number of conference participants is not unchanged, it may be desired to change a conference place according to the number of participants.

On the other hand, in the TV conference system of the related art, when a camera and a monitor are installed once, since the positions and the angles thereof are fixed, the installing positions and angles of the camera and the monitor must be changed each time a conference style and a conference place are changed. Further, since the camera, the monitor and a TV conference apparatus are connected through cables, the cables must be also reconnected, which requires a very troublesome job. Accordingly, the TV conference apparatus of the related art has a problem in that it lacks user-friendliness because a degree of freedom of a conference style and a change of a conference place are inevitably restricted.

In the TV conference system of the related art, a camera installed in a conference room of an opposite station is ordinarily panned, tilted, and zoomed using a TV conference apparatus installed in a conference room of an own station. However, even if an image pickup state in the conference room in the opposite station is changed using these functions, it is difficult to display all the conference participants on a monitor in the station on this side. Accordingly, even in the TV conference systems disclosed in the patent documents D1 and D2, it is difficult to grasp the condition of conference participants other than a speaker, the atmospheres in conference rooms, and the like in both the conference rooms of the own and opposite stations. Thus, the TV conference systems disclosed in the patent documents D1 and D2 still have a problem in the lack of a sense of identity among all the conference participants and a feeling of actually participating in a conference.

SUMMARY OF THE INVENTION

Accordingly, an object of the present invention, which was made in view of the above points, is to provide a TV conference apparatus which can easily change a conference style and a conference place as well as can grasp the condition of all the conference participants, the atmosphere in a conference room, and the like, is excellent in user-friendliness, and can improve a feeling of actually participating in a conference.

According to a first aspect of the present invention, a TV conference apparatus installed in each of a plurality of conference rooms and connected to each other through a communication network is characterized by including a main body provided with a control unit, a plurality of monitors connected to the control unit, arms for connecting the plurality of monitors to the main body so as to move a part or all of the plurality of monitors, and a camera connected to the control unit and disposed to an upper portion of the main body so as to pick up an image of an entire circumference, wherein the plurality of monitors and the camera are disposed integrally with the main body.

According to the present invention, since the camera capable of picking up the image of the entire circumference is provided as well as the plurality of monitors are connected to the main body such that a part or all of them can be moved, various types of conference styles can be dealt with by moving the positions of the monitors according to a conference style.

According to the present invention, since the plurality of monitors and the camera are disposed integrally with the main body, even if the positions of the monitors are changed according to the change of a conference style, a conference participant need not to make rewiring.

According to the present invention, even of a conference room is changed, since it is sufficient to reconnect a network cable and a power supply cable after the TV conference apparatus is moved, a conference style and conference place can be easily changed.

Further, according to the present invention, the image information of an entire conference room can be obtained by the camera capable of picking up the image of the entire circumference, in addition to the image information of all the conference participants. Therefore, when the image information is transmitted to a TV conference apparatus in an opposite station and displayed on monitors, it is possible to grasp the condition of the conference participants other than a speaker, the atmospheres in the conference room, and the like in both the conference rooms. With the arrangement described above, all the conference participants can be provided with a sense of identity, thereby a feeling of actually participating in a conference can be improved.

In the TV conference apparatus, the arms may connect the plurality of monitors to the main body such that a part or all of them are free to turn about a vertical axis.

In the TV conference apparatus, a first state, in which the plurality of monitors are disposed forward of the main body in line with each other, may be switched with a second state, in which the plurality of monitors are disposed sideward or rearward of the main body.

In the TV conference apparatus, the arms may have monitor support portions for supporting each of the plurality of monitors such that each of them is free to turn about a horizontal axis. According to the arrangement, the inclining angles of the respective monitors can be optionally adjusted.

In the TV conference apparatus, each of the plurality of monitors may have a touch panel. According to the arrangement, the operability of the TV conference apparatus can be improved.

In the TV conference apparatus, the main body may have an accommodating portion for accommodating the camera in the inside thereof. According to the arrangement, the camera can be protected from being made dirty or scratched.

The TV conference apparatus may have a grip disposed to an upper portion of the main body. According to the arrangement, the TV conference apparatus can be easily carried.

The control unit may have a division means for dividing an image picked up by the camera and a display selection means for selectively displaying an image before it is divided or an image after it is divided on each of the plurality of monitors. According to the arrangement, an image can be displayed in a display mode suitable for a conference style.

The TV conference apparatus may have microphones whose voice collecting directions are set corresponding to the display directions of the plurality of monitors, and the microphones may be disposed integrally with the main body.

According to the arrangement, even if a conference style and a conference room are changed, since the positions at which the microphones are installed need not be changed and wirings need not be set again, the conference style and the conference room can be more easily changed.

The TV conference apparatus may include light emission portion for emitting light according to the voice collecting levels of the microphones. According to the arrangement, the conference participants can aware whether or not their voices are collected by observing the light emitting state of the light emission portion. Therefore, a conference participant making a speech can easily grasp whether or not the contents of his or her speech are heard by the conference participants in a conference room on an opposite station, thereby it is possible to improve the dialogicality between the conference room on an own station and conference room on the opposite station.

BRIEF DESCRIPTION OF THE DRAWINGS

FIG. 10A is a view showing an example of a conference style;

FIG. 10B is a view showing another example of the conference style;

DESCRIPTION OF THE PREFERRED EMBODIMENTS

Figure 1:
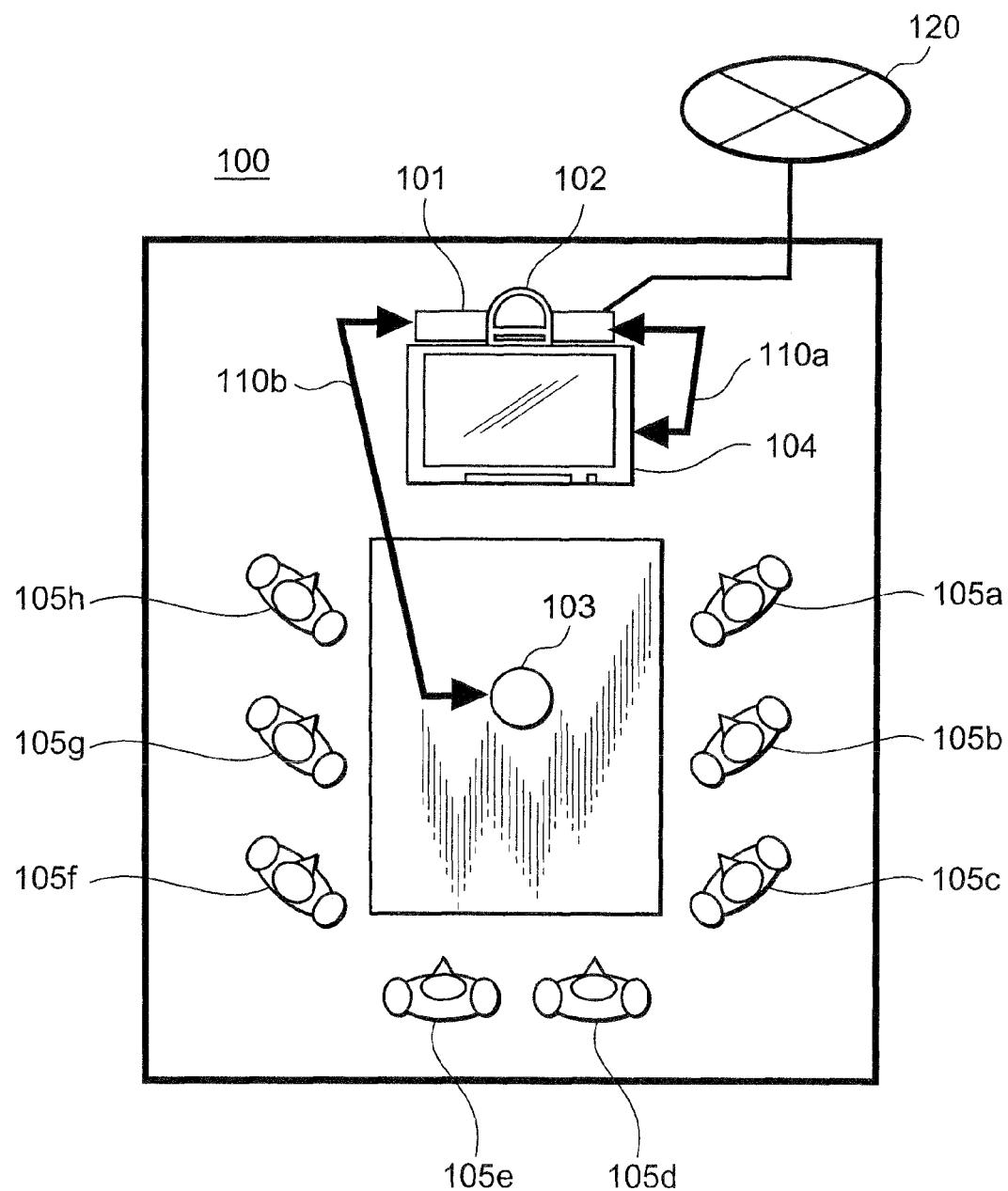
FIG. 1 is an arrangement view of a typical TV conference system according to a related art.

Next, an embodiment of the present invention will be explained referring to the drawings in detail.

FIGS. 2 to 7 are views showing an embodiment of a TV conference apparatus according to the present invention. The TV conference apparatus 1 includes a main body 3 disposed on a base 2, a plurality of monitors 5a to 5c, arms 6b, 6c for movably connecting the monitors 5b, 5c to the main body 3, a camera 7, a plurality of microphones 8a to 8c, and a connector unit 10 including a network connector for connection a network cable, a power supply connector for connecting a power supply cable, and the like (refer to FIG. 6). The monitor 5a to 5c, the camera 7, and the microphones 8a to 8c are disposed to the main body 3 integrally therewith. They are electrically connected in the inside of the TV conference apparatus 1.

The main body 3 is formed in a square column shape having a rectangular cross section. The main body 3 has circuits for controlling the plurality of monitors 5a to 5c, the camera 7, and the microphones 8a to 8c and circuits for controlling the transmission and reception of the information to and from a TV conference apparatus installed in a conference room in an opposite station, and the like. These circuits are disposed in the inside of the main body 3 and serve as controllers. The controllers control the display mode of the respective monitor 5a to 5c, the image pickup range of the camera 7, the voice collecting level of the microphones 8a to 8c, and the like as well as transmits the image information and the voice information obtained by the TV conference apparatus 1 in an own station to the TV conference apparatus in the opposite station and receives the image information and the voice information obtained by the TV conference apparatus in the opposite station.

Each of the plurality of monitors 5a to 5c is composed of, for example, a liquid crystal panel display and the like. Touch panels 4a to 4c are disposed on the display screens of the monitors 5a to 5c. Menu icons are displayed on the display screens of the monitors 5a to 5c. The menu icons include a communication manipulation icon for designating a conference room of a connecting destination, in addition to designating an image picked up by the camera 7 and an image transmitted from the conference room in the opposite station, a camera manipulation icon for manipulating the camera 7 in the own station or the camera in the opposite station, menu icons such as a monitor manipulation icon for manipulating the display mode of the monitors 5a to 5c, and the like. Various types of manipulation can be carried out by touching the respective icons.

Further, in the touch panels 4a to 4c of the monitors 5a to 5c, a character, a picture, and the like can be drawn on the display screens of the monitors 5a to 5c using a touch pen and the like. The drawn character, picture, and the like can be transmitted to the TV conference apparatus in the opposite station as image information. Note that, the various types of manipulations such as the communication manipulation, the camera manipulation, the monitor manipulation, and the like can be also carried out using a not shown remote controller.

A speaker 12 is built in each of the monitors 5a to 5c to output the voices collected by the microphones 8a to 8c and the voices transmitted from the TV conference apparatus in the opposite station.

Figure 6:
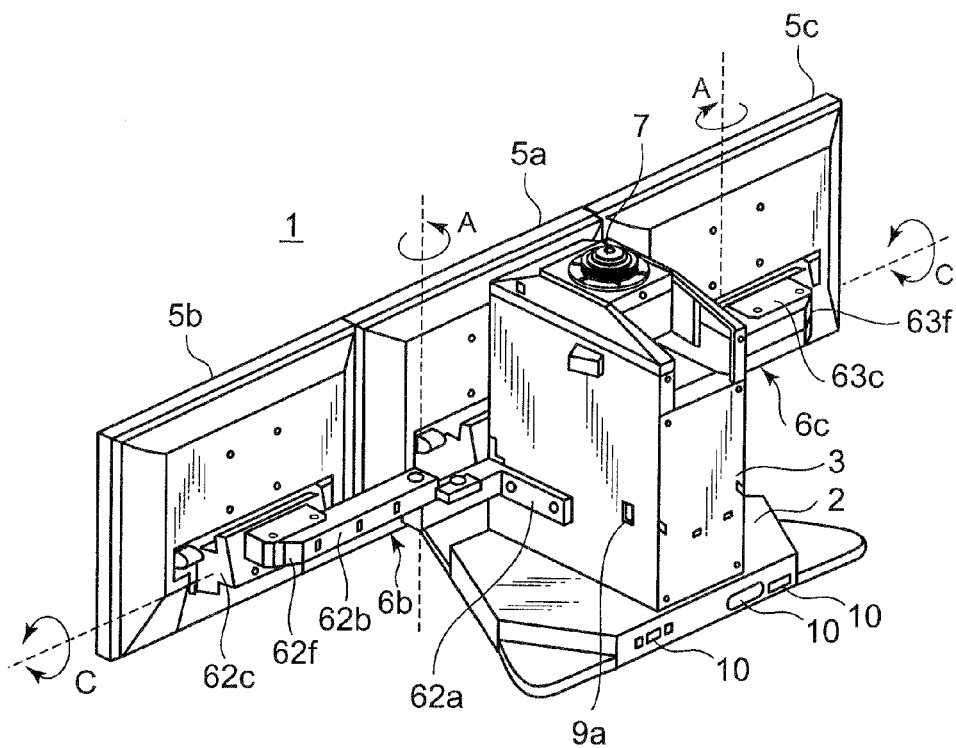
FIG. 6 is a perspective view of the embodiment of the TV conference apparatus according to the present invention when it is watched from another direction different from that of FIG. 5.
Figure 7:
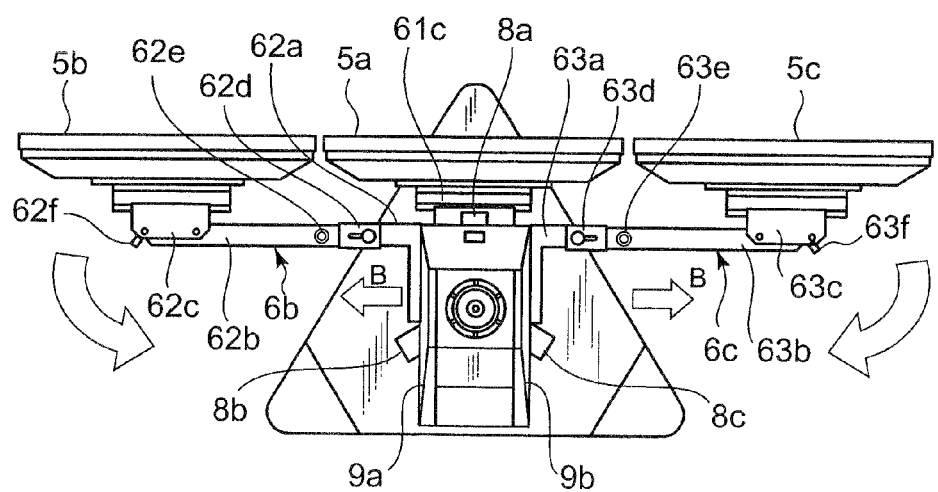
FIG. 7 is an upper view of the TV conference apparatus of FIGS. 5 and 6.

The arms 6b, 6c are disposed to mechanically couple or connect the monitors 5b, 5c to side surfaces of the main body 3. As shown in FIG. 6 and FIG. 7, the arms 6b, 6c include mounting portions 62a, 63a, square-rod-shaped arm bodies 62b, 63b, monitor support portions 62c, 63c, locking projections 62f, 63f, and slide locks 62d, 63d. The mounting portions 62a, 63a have an L-shape and secured to side surfaces of the main body 3 by screws and the like. The arm bodies 62b, 63b have one ends coupled with the mounting portions 62a, 63a. The monitor support portions 62c, 63c are coupled with the other ends of the arm bodies 62b, 63b for supporting the monitors 5b, 5c. The locking projections 62f, 63f are disposed to the monitor support portions 62c, 63c. The slide locks 62d, 63d are disposed to the mounting portions 62a, 63a.

The arm bodies 62b, 63b are coupled with the mounting portions 62a, 63a such that they are free to turn about a vertical axis using support shafts 62e, 63e as fulcrums (arrows A in FIG. 6). Accordingly, as shown in, FIG. 2 to FIG. 4, the monitors 5b, 5c can be folded back to both side surfaces of the main body 3, thereby the positions of the monitors 5a to 5c can be set such that the display surfaces of the monitors 5a to 5c faces three directions at the intervals of about 120°. At the time, the locking projections 62f, 63f disposed to the monitor support portions 62c, 63c are locked to locking holes 9a, 9b formed to side surfaces of the main body 3, thereby the monitor support portions 62c, 63c are held. With this arrangement, the positions of the monitors 5b, 5c are maintained.

Figure 5:
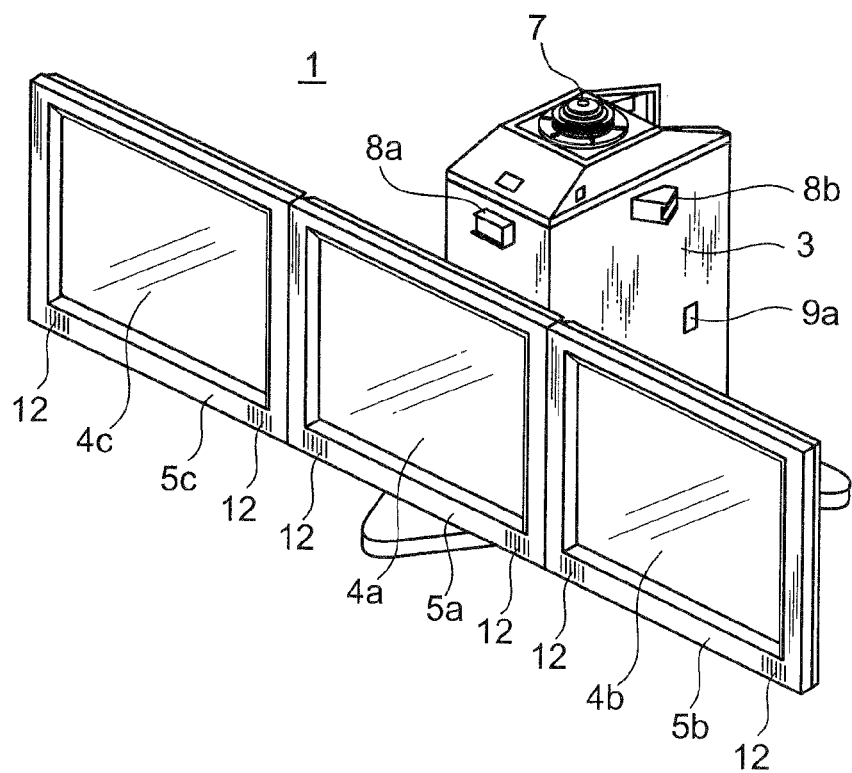
FIG. 5 is a perspective view of the embodiment of the TV conference apparatus according to the present invention for illustrating another arrangement different from that of FIG. 2.

When the arm bodies 62b, 63b are turned forward of the main body 3 from the state in which the monitors 5b, 5c are folded back to both side surfaces of the main body 3, the positions of the monitors 5a to 5c can be set such that the monitors 5b, 5c are flush with the monitor 5a as shown in FIG. 5 to FIG. 7. At the time, when the slide locks 62d, 63d disposed to the mounting portions 62a, 63a are slid in directions B of FIG. 7, one ends of the arm bodies 62b, 63b are abutted against the slide locks 62d, 63d, thereby the arm bodies 62b, 63b can be held in the state in which the monitors 5a to 5c are disposed in-line with each other. With this arrangement, even if the touch panels 4b, 4c of the monitors 5b, 5c are touched and press force is applied to the monitors 5b, 5c to move them backward, the positions thereof can be prevented from being changed.

Figure 2:
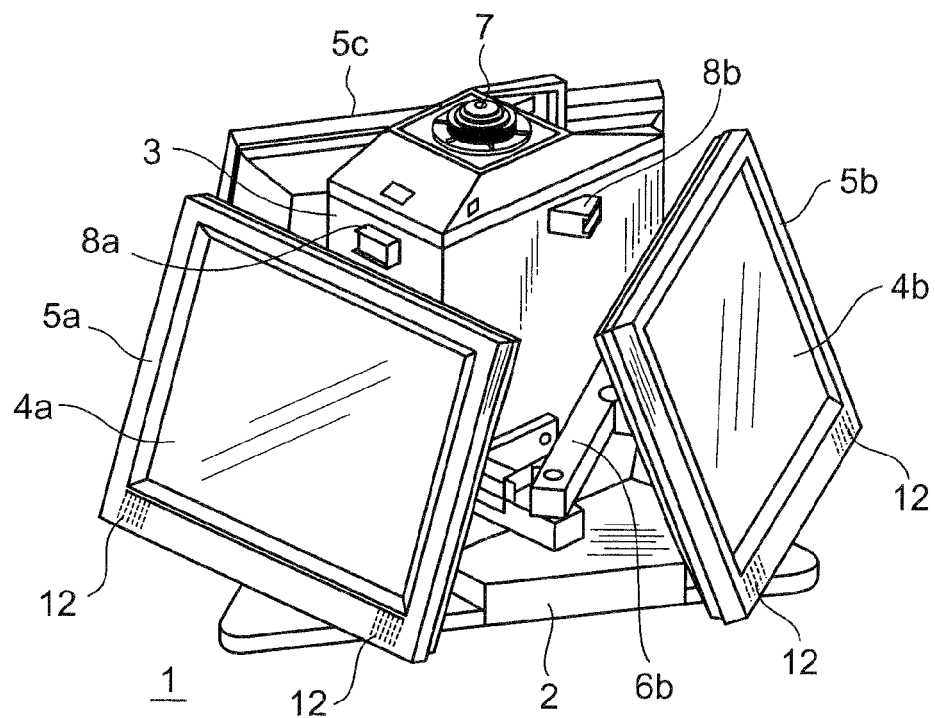
FIG. 2 is a perspective view of an embodiment of a TV conference apparatus according to the present invention.
Figure 3:
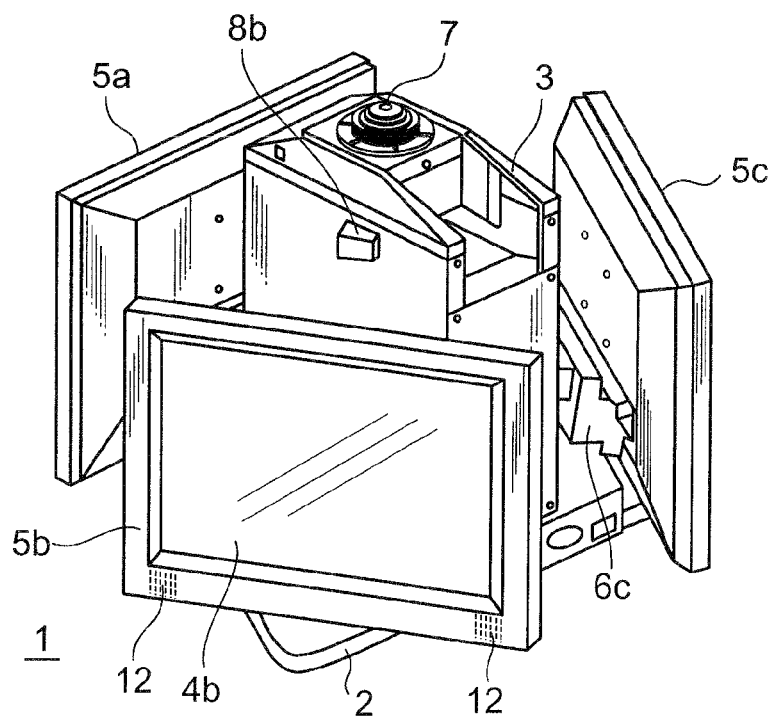
FIG. 3 is a perspective view of the embodiment of the TV conference apparatus according to the present invention when it is watched from another direction different from that of FIG. 2.
Figure 4:
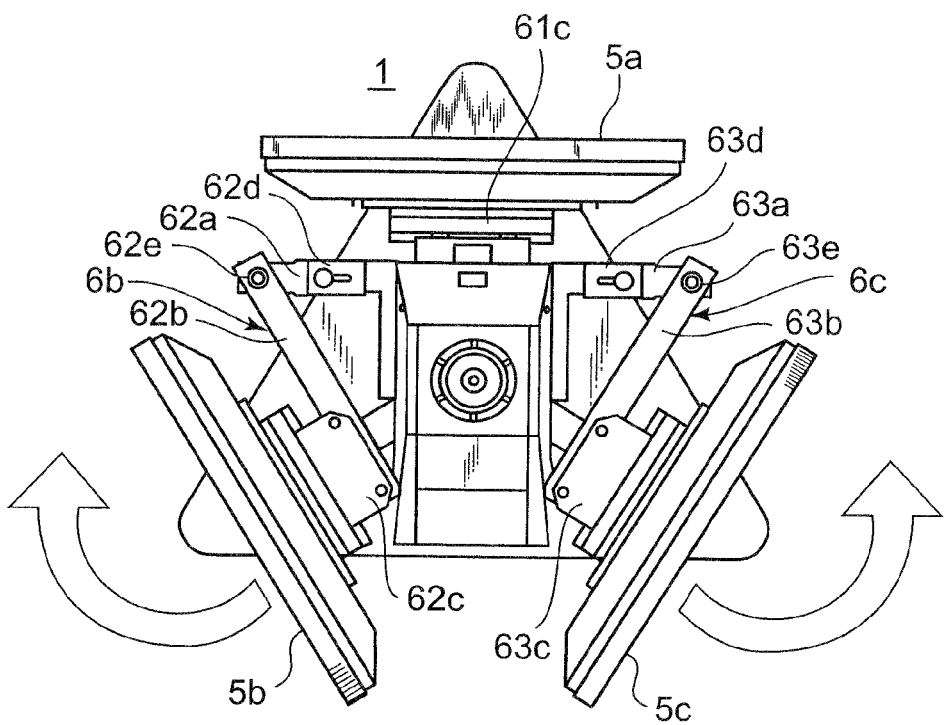
FIG. 4 is an upper view of the TV conference apparatus of FIGS. 2 and 3.

Note that, when the positions of the monitors 5b, 5c are changed from the positions shown in FIG. 5 to FIG. 7 to the positions shown in FIG. 2 to FIG. 4, the slide locks 62d, 63d can be unlocked by sliding them in directions opposite to the directions B of FIG. 7 so that the one ends of the arm bodies 62b, 63b are separated from the slide locks 62d, 63d.

The arm bodies 62b, 63b described above may be manually turned by a conference participant or may be mechanically turned by motors and the like built in the coupling portions of the arm bodies 62b, 63b and the mounting portions 62a, 63a.

The monitors 5b, 5c are coupled with the arm bodies 62b, 63b through the monitor support portions 62c, 63c so that they are free to turn about a horizontal axis (an arrow C of FIG. 6) using the coupling portions thereof with the monitor support portions 62c, 63c as support shafts. Accordingly, the inclining angles of the monitors 5b, 5c can be optionally adjusted. As shown in FIG. 4 and FIG. 7, a monitor support portion 61c is disposed in front of the main body 3 to support the monitor 5a. The monitor support portion 61c is arranged to turn the monitor 5a about the horizontal axis likewise the monitor support portions 62c, 63c. Accordingly, the inclining angle of the monitor 5a can be optionally adjusted likewise the monitors 5b, 5c.

The camera 7 is composed of an entire circumference camera having a panorama lens mounted thereon so that a 360 degree panoramic image can be picked up by a single unit and disposed to an upper portion of the main body 3 so that it is located above the upper edges of the monitors 5a to 5c. The panorama lens is horizontally disposed to an upper portion of the camera 7. Accordingly, a 360 degree panoramic image can be obtained from the camera 7 along the horizontal surface of the panorama lens. Note that a fish-eye lens mechanism and a wide angle lens mechanism can be used as an image pickup lens mechanism used in the camera 7, in addition to a panorama lens mechanism.

Figure 8:
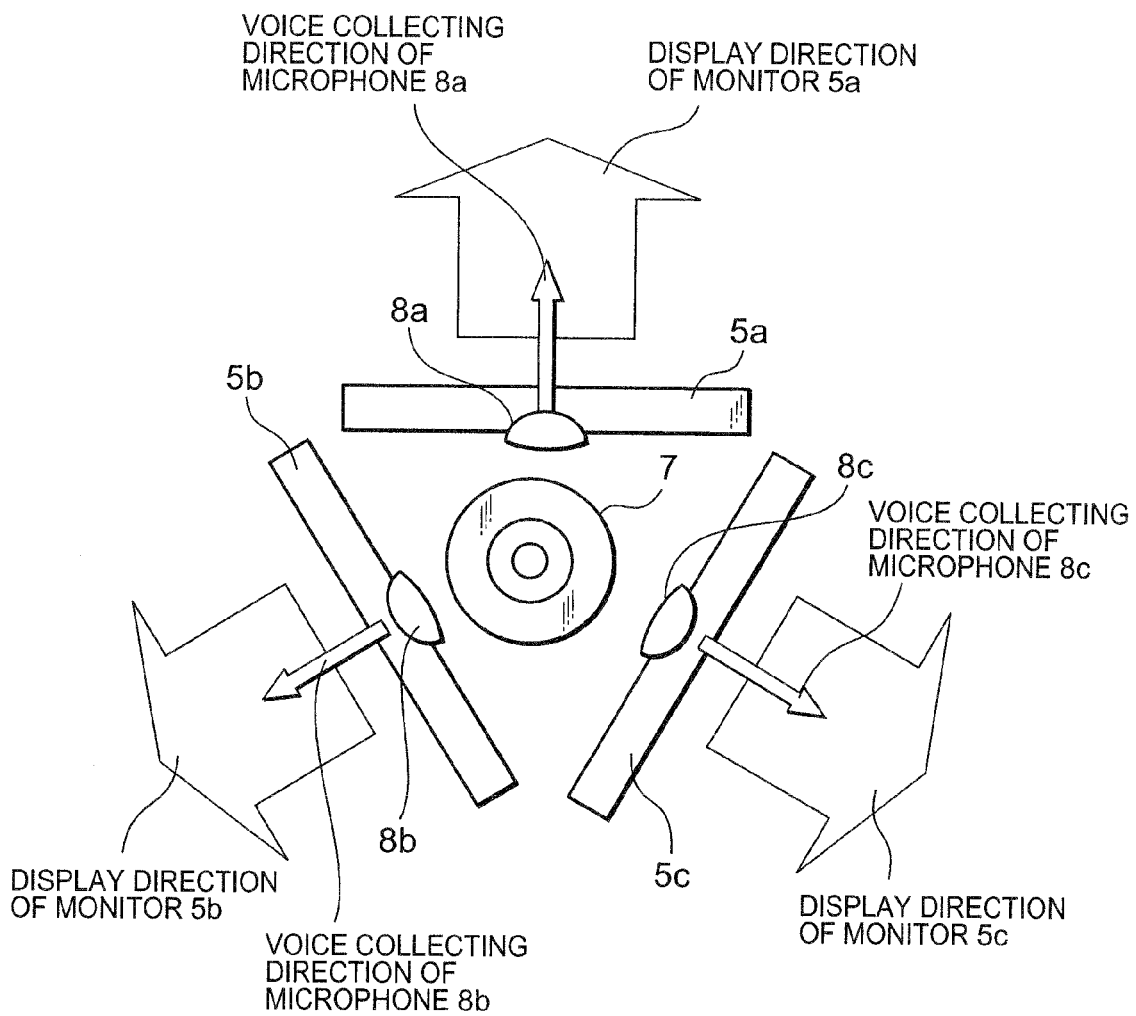
FIG. 8 is a view showing a voice collecting direction of a microphone and a display direction of a monitor.

As shown in FIG. 8, the plurality of microphones 8a to 8c are disposed on the front surface and both the side surfaces of the main body 3 so that the voice collecting direction of the microphone 8a coincides with the display direction of the monitor 5a, the voice collecting direction of the microphone 8b coincides with the display direction of the monitor 5b, and the voice collecting direction of the microphone 8c coincides with the display direction of the monitor 5c.

Figure 9:
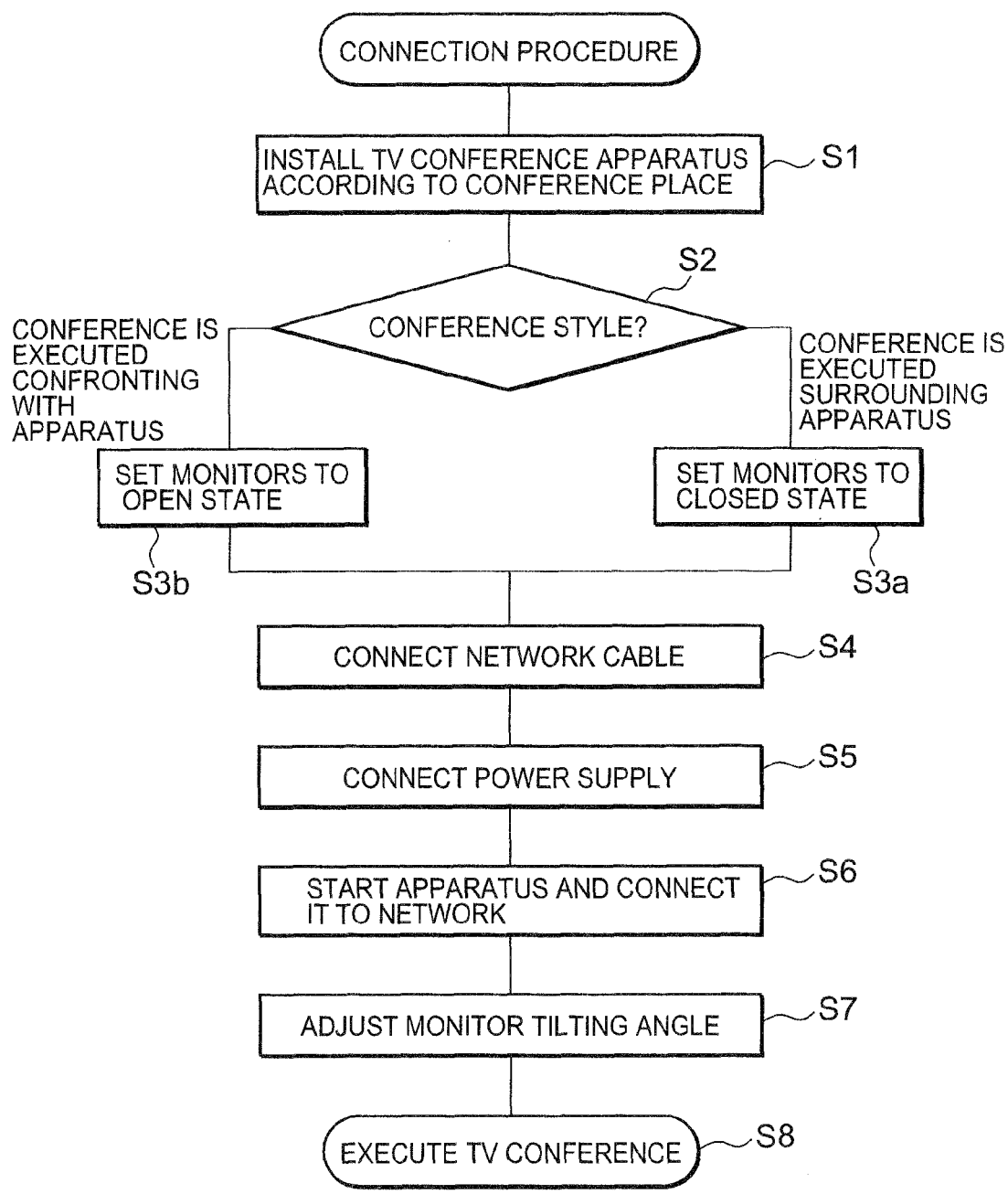
FIG. 9 is a flowchart showing a procedure when a TV conference is held using the TV conference apparatus.

FIG. 9 is a flowchart showing a procedure when a TV conference is held using the TV conference apparatus 1.

The TV conference apparatus 1 is carried into a conference room in which the TV conference is held, the TV conference apparatus 1 is disposed according to a conference place (step S1), and a conference style by which the TV conference is held is selected (step S2). As shown in, for example, FIG. 10A, when the conference is held using a round conference table, after the monitors 5b, 5c are folded back to both side surfaces of the main body 3 and the positions of the monitors 5a to 5c are set to the state shown in FIG. 2 to FIG. 4, the TV conference apparatus 1 is disposed approximately at the center of the conference table (step S3a). In this state, respective conference participants are caused to sit down in front of the monitors 5a to 5c so that all the conference participants can observe the monitors 5a to 5c in front of them. At the time, since the camera 7, which is disposed to the upper portion of the main body 3 of the TV conference apparatus 1, and the microphones 8a to 8c, which are disposed to the front surface and both side surfaces of the main body 3, are located at the distal ends of the line of sights of the respective conference participants, the respective conference participants can make a discussion in the conference with natural eye lines without being conscious of an image pickup direction and a voice collecting direction.

In contrast, as shown in, for example, FIG. 10B, when a conference is held by conference participants sitting in front of a conference table, after the monitors 5a to 5c are moved forward of the main body 3 and the positions of the monitors 5a to 5c are set to the state shown in FIG. 5 to FIG. 7, the TV conference apparatus 1 is placed so that the monitors 5a to 5c confront with the conference participants (step S3b). With this arrangement, all the conference participants can observe the monitors 5a to 5c in front of them. Since the camera 7 and the microphone 8a disposed on the front surface of the main body 3 are located at the distal ends of the line of sights of the respective conference participants also in this case, the respective conference participants can make a discussion in the conference with natural eye lines.

Next, the network cable is connected to the connector unit 10 (step S4), and the power supply cable is connected to a power supply outlet (step S5).

Next, the TV conference apparatus 1 is started by depressing a power supply button, and the TV conference apparatus 1 is electrically connected to a communication network. With this operation, the TV conference apparatus 1 is connected to a TV conference apparatus installed in other conference room (opposite station) through the communication network (step S6).

Thereafter, the inclining angles of the monitors 5a to 5c are adjusted when necessary (step S7), and the TV conference is held (step S8).

As described above, according to the embodiment, since the camera 7 that can pick up an image of an entire circumference is disposed to the upper portion of the main body 3 as well as the monitors 5b, 5c are coupled with the main body 3 so as to be turned about the vertical axis, and further the microphones 8a to 8c are disposed so that the voice collecting directions thereof coincide with the display directions of the plurality of monitors 5a to 5c, various types of conference styles can be dealt with only by turning the monitors 5a to 5c.

In addition to the above, since any of the monitors 5a to 5c, the camera 7, and microphones 8a to 8c is disposed integrally with the main body 3 and the electric connections thereof are already carried out in the inside of the TV conference apparatus 1, a conference participant need not to make rewiring even if the positions of the monitors 5a to 5c are changed according to a change of a conference style.

Further, even if a conference room is changed, since it is sufficiently only to reconnect the network cable and the power supply cable after the TV conference apparatus 1 is moved, a conference style and a conference place can be easily changed.

Incidentally, in the embodiment, the upper end of the camera 7 is located above the upper edges of the monitor 5a to 5c to pick up the image of the entire circumference, a lens portion is placed in a projecting state, and thus a lens surface may be scratched or made dirty. To deal with this problem, the TV conference apparatus 1 is provided with a protection mechanism for accommodating the camera 7 in the main body 3 when it is not used to protect the lens portion of the camera 7.

Figure 11A:
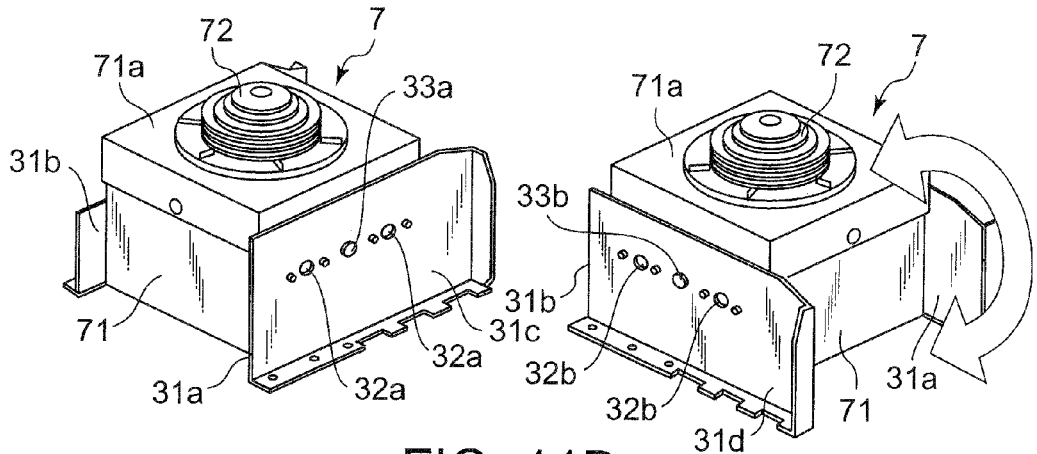
FIG. 11A is an enlarged perspective view of a camera.
Figure 11B:
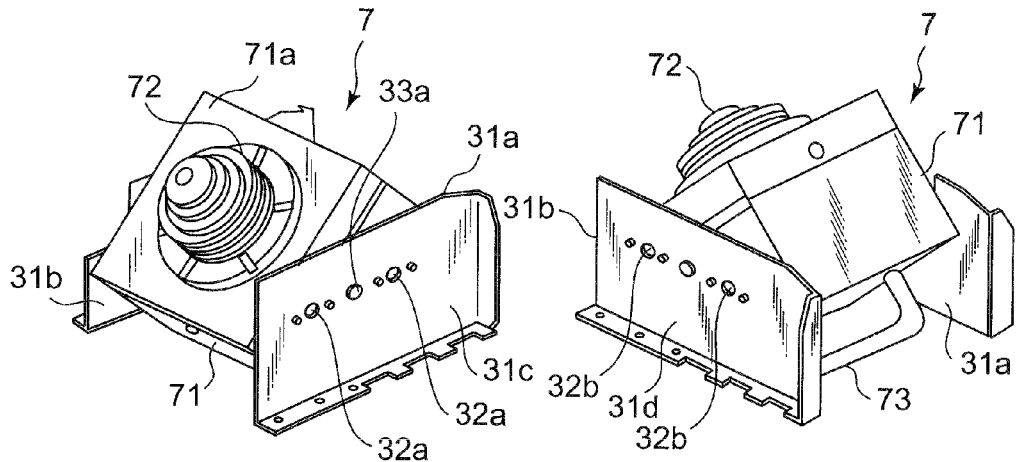
FIG. 11B is an enlarged perspective view of the camera.
Figure 11C:
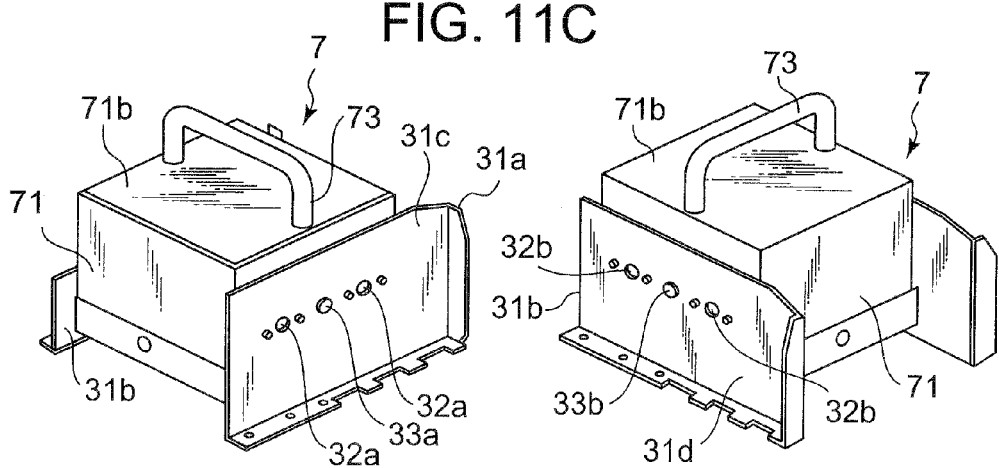
FIG. 11C is an enlarged perspective view of the camera.

FIG. 11A to FIG. 11C are enlarged perspective views of the camera 7. As shown in the figures, the camera 7 includes a camera main body 71, a lens mechanism 72 disposed on the upper surface 71a of the camera main body 71, a grip portion 73 fixed on the back surface 71b of the camera main body 71, and side plates 31a, 31b disposed on both side surfaces of the camera main body 71 for coupling the camera main body 71 so that it is free to turn about a horizontal axis using support shafts 33a, 33b as fulcrums.

The side plates 31a, 31b are attached to an upper portion of the main body 3 by screws and the like. With this arrangement, the camera main body 71 is coupled with the main body 3 of the TV conference apparatus 1. Two locking hole 32a are formed to the main surface 31c of the side plate 31a, and two locking holes 32b are formed to the main surface 31d of the side plate 31b. When the lens mechanism 72 are located upward (FIG. 11A) and when the grip portion 73 is located upward (FIG. 11C), locking projections (not shown) formed to both side surfaces of the camera main body 71 are locked to these locking hole 32a, 32b. With this arrangement, the position of the camera main body 71 is maintained.

Figure 12:
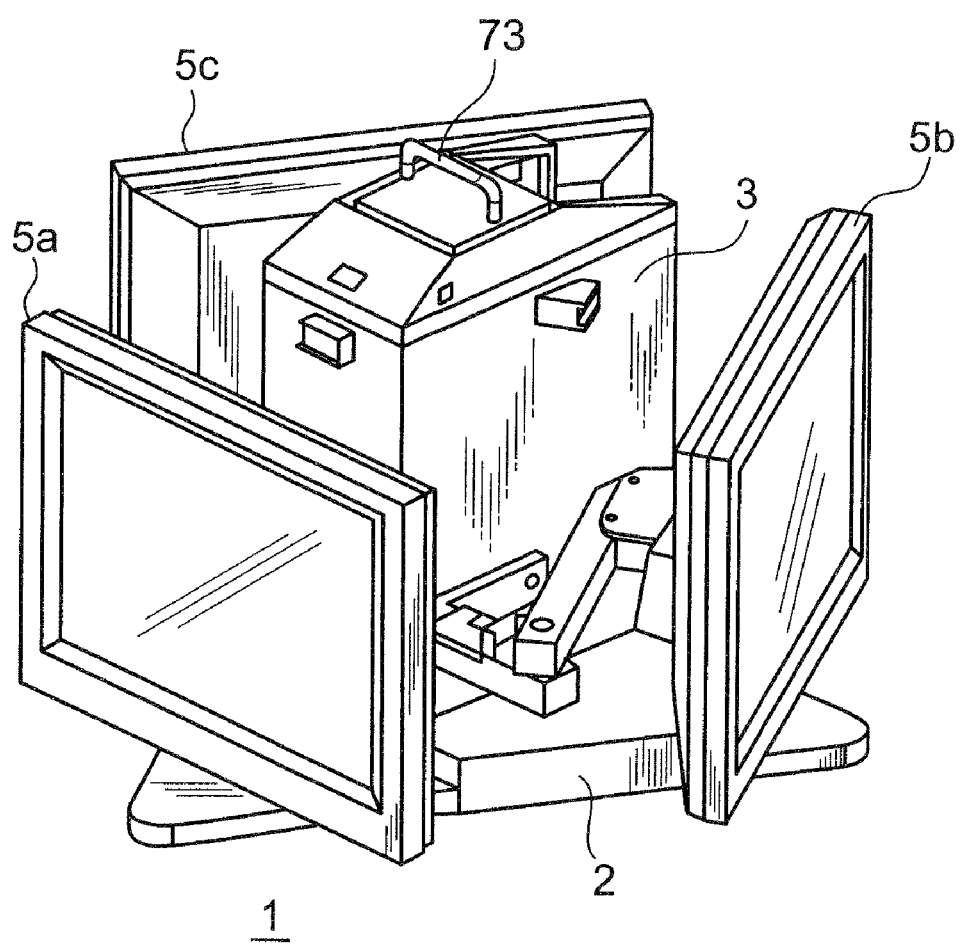
FIG. 12 is a perspective view showing a state in which a grip is formed on an upper portion of a main body.

According to the arrangement, when the TV conference apparatus 1 is not used, the lens mechanism 72 is accommodated in the main body 3 so that the lens mechanism 72 is not exposed, thereby the lens mechanism 72 can be protected. Further, when the lens mechanism 72 is accommodated in the main body 3, the grip portion 73 is exposed at the same time, thereby a grip portion is formed to an upper portion of the main body 3 as shown in FIG. 12. Thus, it is also possible to easily carry the TV conference apparatus 1.

Figure 13:
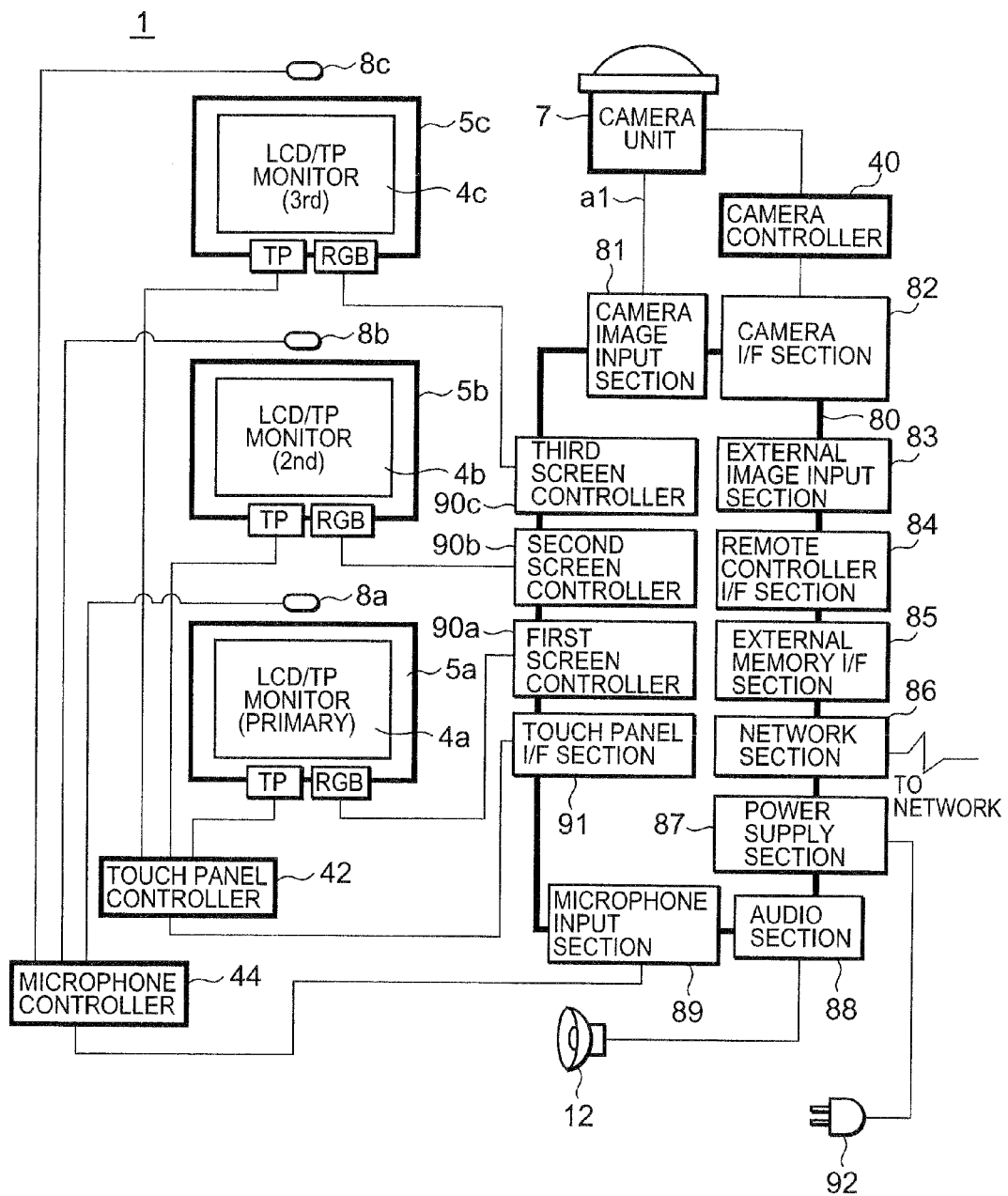
FIG. 13 is a block diagram showing an electric arrangement of the TV conference apparatus.

FIG. 13 is block diagram showing an electric arrangement of the TV conference apparatus 1 shown in FIG. 2 to FIG. 7. As shown in the figures, TV conference apparatus 1 includes a camera controller 40, a touch panel controller 42, a microphone controller 44, and a controller 80. The camera controller 40 is connected to the camera 7 and controls the operation thereof, the touch panel controller 42 is connected to the touch panels 4a to 4c, detects the inputs to the touch panels 4a to 4c, and determines to which axis of which monitor an input is made, the microphone controller 44 is connected to the microphones 8a to 8c and controls the voice collecting levels and the like of the respective microphones, and the controller 80 controls the operation of the TV conference apparatus 1 in its entirety. The above-mentioned controllers may collectively be called a control unit.

The controller 80 includes a camera image input section 81, a camera I/F section 82, an external image input section 83, a remote controller I/F section 84, an external memory I/F section 85, a network portion 86, a power supply section 87, an audio section 88, a microphone input section 89, a first screen controller 90a, a second screen controller 90b, and a third screen controller 90c, a touch panel I/F section 91, and the like. An image picked up by the camera 7 is input to the camera image input section 81. The camera I/F section 82 transmits the control contents of the camera 7 to the camera controller 40. The image from an external device such as a personal computer and the like is input to the external image input section 83. The remote controller I/F section 84 receives an instruction signal from a remote controller. The external memory I/F section 85 reads and records information from an external memory such as a removable memory and the like. The network portion 86 is connected to the network, transmits the image information picked up by the camera 7 and the voice information collected by the microphones 8a to 8c to the conference room in the opposite station as well as receives the image information and the voice information transmitted from the TV conference apparatus in the opposite station. The power supply section 87 has a power supply cable 92 connected thereto. The audio section 88 drives the speaker 12 based on voice information. The microphone input section 89 is connected to the microphone controller 44. The first, second, and third screen controllers 90a, 90b, and 90c control the contents displayed on the monitors 5a to 5c. The touch panel I/F section 91 is connected to the touch panel controller 42.

Figure 14:
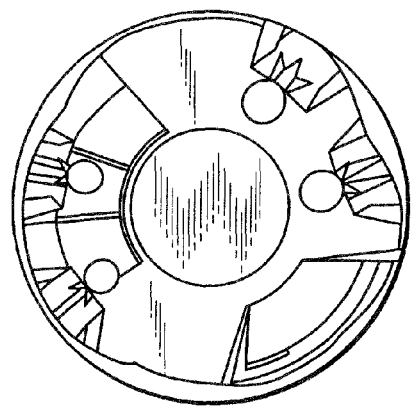
FIG. 14 is a view showing a subject image formed on the camera.
Figure 15A:
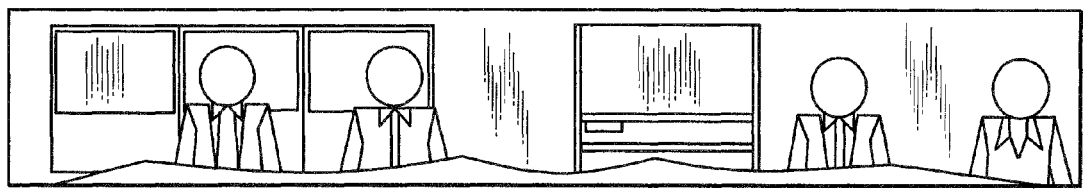
FIG. 15A is a view showing an example of an image created by the TV conference apparatus.

As described above, since the TV conference apparatus 1 according the embodiment uses the entire circumference camera that can pick up the image of the entire circumference as the camera 7, a subject image formed to the camera 7 is made to annular continuous images formed around the camera 7 as shown in FIG. 14. Panorama image information (FIG. 15A) developed in-plane based on the subject image is output from the camera 7. The panorama image information includes the image information of the image of the entire conference room including all the conference participants. After the image information output from the camera 7 is input to the controller 80 through the camera image input section 81 of FIG. 13, it is transmitted to the TV conference apparatus in the opposite station through the network portion 86 and received by the TV conference apparatus in the opposite station.

The TV conference apparatus 1 where the panorama image information (FIG. 15A) is received displays a display image according to the received panorama image information on monitors 5a to 5c. At the time, the display modes of the respective monitors 5a to 5c can be changed by touching touch panels 4a to 4c disposed to the monitors 5a to 5c.

Figure 16A:
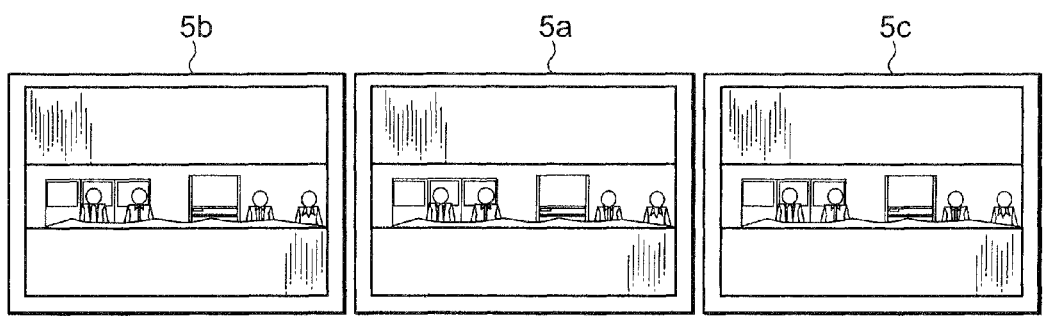
FIG. 16A is a view showing an example of a display pattern of a monitor.

As shown in, for example, FIG. 16A, when a conference participant instructs the display screens of the respective monitors 5a to 5c to display the received panorama images through the touch panels 4a to 4c, the controller 80 controls the display mode of the monitors 5a to 5c through first to third screen controllers 90a to 90c and causes the display screens of the respective monitors 5a to 5c to display the panorama images. This display mode is effective when the TV conference is held in the state of FIG. 10A in which the monitors 5a to 5c are folded because the respective monitors 5a to 5c can equally display the state of the conference room on the side from which the image information is transmitted.

Figure 15B:
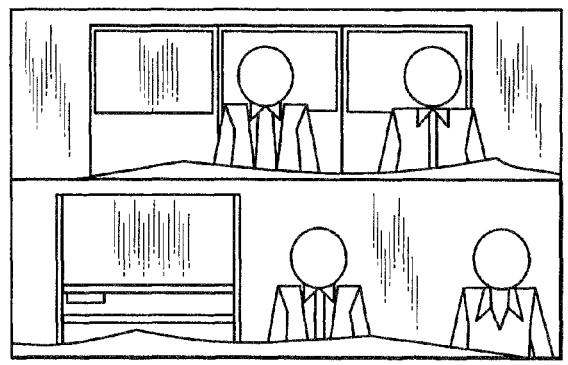
FIG. 15B is a view showing another example of the image created by the TV conference apparatus.
Figure 16B:
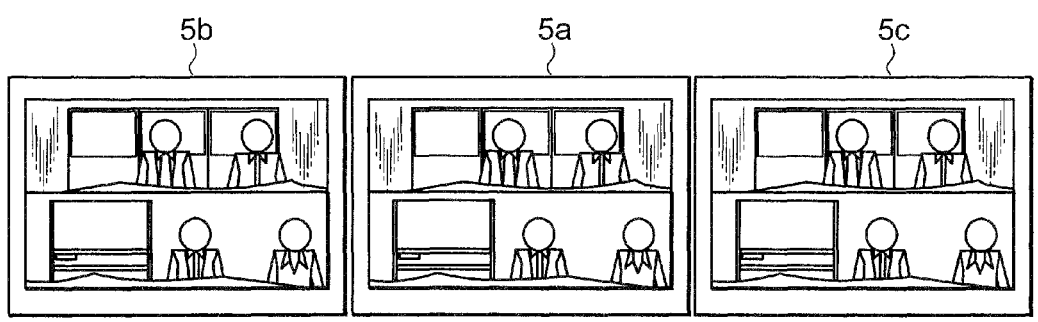
FIG. 16B is a view showing another example of the display pattern of the monitor.

Further, as shown in FIG. 16B, when a conference participant instructs the display screens of the respective monitors 5a to 5c to display images divided up and down, the controller 80 divides the panorama image information into two portions based on the panorama image information (FIG. 15A) input through the network portion 86 and creates image information by vertically dividing the panorama image information (FIG. 15B) as well as controls the display mode of the monitors 5a to 5c based on the created image information, and causes the display screens of the respective monitors 5a to 5c to display the images divided into the two portions. Since the state of the conference room on the side from which the image information is transmitted can be displayed on the respective monitors 5a to 5c even in the above display mode likewise the display mode of FIG. 16A, this is effective when the TV conference is held in the state in which the monitors 5a to 5c are folded.

Figure 16C:
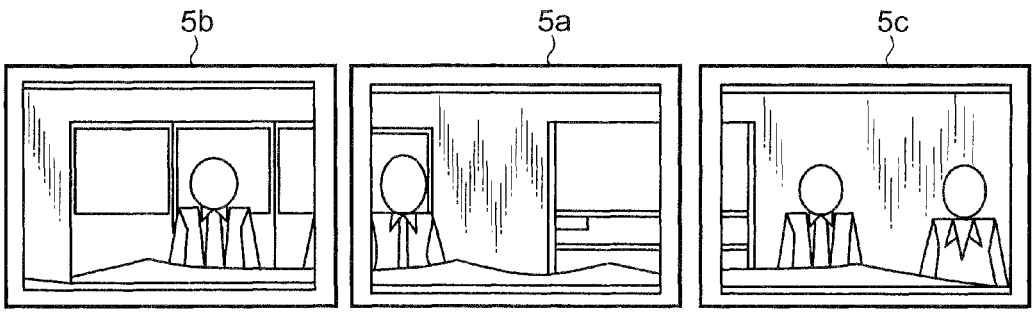
FIG. 16C is a view showing still another example of the display pattern of the monitor.

On the other hand, as shown in FIG. 16C, a conference participant instructs to display a panorama image on the overall monitors 5a to 5c, the controller 80 creates image information in which the panorama image information (FIG. 15A) is divided into three portions horizontally as well as causes the monitors 5a to 5c to sequentially display the images divided into the three portions by controlling the display mode of the monitors 5a to 5c based on the created image information. This display mode is effective when the TV conference is held in a state that the monitors 5a to 5c are disposed in line with each other as shown in FIG. 10B because the monitors 5a to 5c can be caused to act as a single monitor.

As described above, according to the embodiment, the entire circumference camera that can pick up the image of the entire circumference is used as the camera 7, and the image information of the overall conference room can be obtained in addition to the image information of all the conference participants. As a result, when the image information is transmitted to the TV conference apparatus in the opposite station and displayed on the monitors, the condition of the conference participants other than a speaker, the atmosphere in the conference room, and the like can be grasped in both the conference rooms. With this arrangement, all the conference participants can be provided with a sense of identity, thereby a feeling of actually participating in a conference can be improved.

Further, according to the embodiment, since an image, which is vertically divided into two portions, or an image, which is horizontally divided into three portions, are created based on the panorama image obtained by the camera 7 and selectively displayed on the monitors 5a to 5c, the images can be displayed in a display mode suitable for a conference style.

Further, according to the embodiment, since the operation for switching the display mode of the monitors 5a to 5c, and the like can be carried out by touching the touch panels 4a to 4c, these operations can be simply carried out, thereby operability can be improved.

Figure 17A:
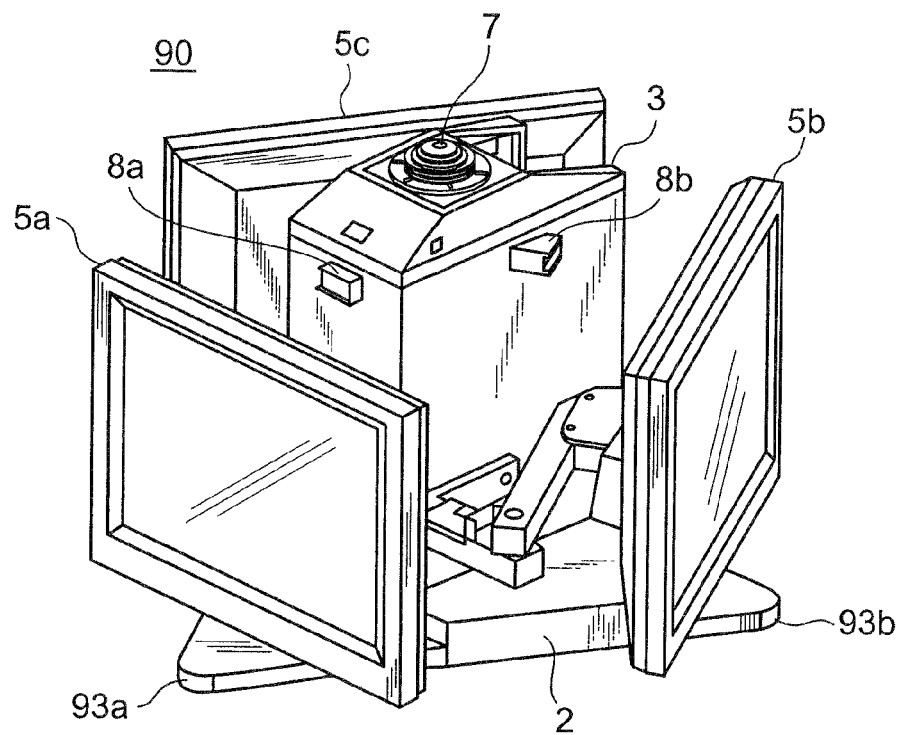
FIG. 17A is a view showing another embodiment of the TV conference apparatus according to the present invention.
Figure 17B:
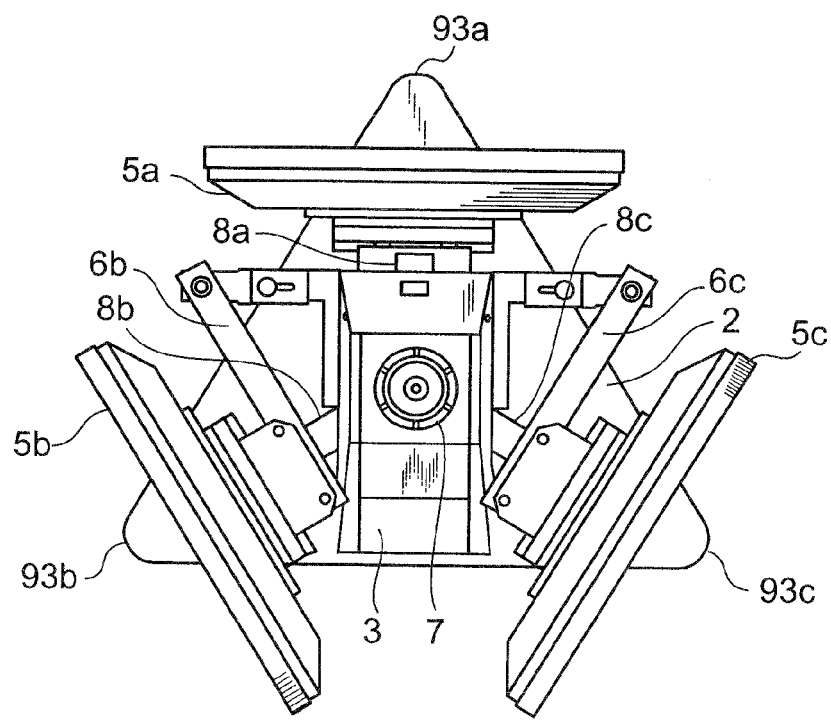
FIG. 17B is an upper view of the TV conference apparatus of FIG. 17A.

FIGS. 17A and 17B are views showing another embodiment of the TV conference apparatus according to the present invention. In the figures, the same components as those of the TV conference apparatus 1 shown in FIG. 2 to FIG. 7 are denoted by the same reference numerals and the description thereof is omitted.

As shown in FIGS. 17A and 17B, a TV conference apparatus 90 includes LEDs (Laser Emission Diode) (light emission portion) 93a to 93c disposed to the respective edges (or corners) of a base 2 formed in a triangular shape when viewed planimetrically, in addition to a main body 3, monitors 5a to 5c, a camera 7, microphones 8a to 8c, and the like.

The LEDs 93a to 93c are disposed in correspondence to the microphones 8a to 8c. Each set of the LED 93a and the microphone 8a, the LED 83b and the microphone 8b, and the LED 93c and the microphone 8c is arranged as a pair. Further, the LEDs 93a to 93c are arranged to emit light when the voice collecting levels of the microphones 8a to 8c exceed a predetermined level.

Since the LEDs 93a to 93c are disposed to the respective edges of the base 2 they are located nearer to conference participants than the monitors 5a to 5c in the state of FIG. 2 and FIG. 3 in which the monitors 5a to 5c are folded. On the other hand, in the state of the FIG. 5 to FIG. 7 in which the monitors 5a to 5c are disposed in line with each other, the LED 93a is located nearer to the conference participants than the monitors 5a to 5c. Accordingly, the conference participants can visually recognize easily the LEDs in any of the states of FIGS. 2 and 3 and FIG. 5 to FIG. 7. Accordingly, the conference participants can be aware whether or not their voices are collected by the microphones 8a to 8c by observing the light emitting state of the LEDs 93a to 93c in any of the case in which the TV conference apparatus 1 is used in the state shown in FIGS. 2 and 3 and the case in which the TV conference apparatus 1 is used in the state shown in FIG. 5 to 7. With this arrangement, a conference participant who makes a speech can easily grasp whether or not the contents of his or her speech are heard by the conference participants in conference room on opposite station, thereby the dialogicality between the conference room in an own station and the conference room in an opposite station can be improved.

The present invention is by no means restricted to the above embodiments and can be variously modified within the scope of the invention in the appended claims, and the modifications of the embodiments are also encompassed in the scope of the invention.

For example, although the monitors 5b, 5c in the embodiments are arranged to move sideward of the main body 3, they may be arranged to move up to rearward of the main body 3.

Further, although the three monitors 5a to 5c are provided in the embodiments, four or more monitors may be provided. Otherwise, the TV conference apparatus may be arranged using only two monitors. In this case, the number of the microphones is preferably determined corresponding to the number of the monitors.

Further, although the monitors 5a to 5c, the camera 7, and the microphones 8a to 8c are disposed integrally with the main body 3 in the embodiments, the microphones 8a to 8c may be disposed separately from the main body 3.

Further, the embodiments show the example for displaying the three display patterns, that is, the panorama image, the two images disposed vertically by dividing the panorama image into the two portions, and the three images disposed by dividing the panorama image into the three portions. However, the images to be displayed on the monitors 5a to 5c are not restricted thereto, and the images of other patterns such as four images disposed vertically and horizontally by dividing the panorama image into four portions, and the like may be displayed.

Further, although the LEDs 93a to 93c are disposed to the respective edges of the base in the embodiment, the positions where the LED 93a to 93c are disposed are not restricted thereto and the LEDs 93a to 93c may be disposed to any positions such as the corners of the monitors 5a to 5c as long as the conference participants can visually recognize them easily.

Further, although the main body 3 is formed in the square column shape having the rectangular cross section in the embodiment, it may be formed in a shape other than the square column shape such as a columnar shape, a conical shape, and the like.

As described above, according to the present invention, there can be provided the TV conference apparatus which makes it possible to easily change a conference style and a conference place as well as makes it possible to grasp the condition of conference participants, the atmosphere of a conference room, and the like, is excellent in user-friendliness, and can improve a feeling of actually participating in a conference.

What is claimed is:

1. A TV conference apparatus installed in each of a plurality of conference rooms and connected to each other through a communication network, comprising:
   a central tower mounted on a base and housing inside a control unit;
   a plurality of monitors connected to the central tower;
   arms for connecting the plurality of monitors to the central tower so as to move the plurality of monitors separately; and
   a 360° camera connected to the control unit and disposed on a top of the central tower above the plurality of monitors,
   wherein the plurality of monitors and the camera are controlled by the control unit,
   wherein the arms are switchable between a first state in which the plurality of monitors are disposed in line with each other on a same side of the central tower, and a second state in which each of the plurality of monitors are disposed on different sides of the central tower, and
   wherein the control unit comprises image division means for dividing an image picked up by the camera and display selection means for selectively displaying an image before it is divided or an image after it is divided on each of the plurality of monitors,
   the TV conference apparatus further comprising microphones whose voice collecting directions are set corresponding to display directions of the plurality of monitors, and the microphones are disposed on the central tower.

2. The TV conference apparatus according to claim 1, wherein the arms connect the plurality of monitors to the central tower such that each of the plurality of monitors is free to turn about a vertical axis.

3. The TV conference apparatus according to claim 1, wherein the arms comprise monitor support portions for supporting each of the plurality of monitors such that each of them is free to turn about a horizontal axis.

4. The TV conference apparatus according to claim 3, wherein each of the plurality of monitors comprises a touch panel.

5. The TV conference apparatus according to claim 1, wherein the camera includes a rotatable camera main body, a lens mechanism disposed on an upper surface of the camera main body, a grip portion on a back surface of the camera main body wherein the grip portion extends above the top of the central tower and is adapted for carrying the TV conference apparatus, and side plates disposed on both side surfaces of the camera main body for coupling the camera main body so that it is free to turn about a horizontal axis using support shafts as fulcrums, and the side plates are attached to the upper portion of the central tower.

6. The TV conference apparatus according to claim 1, comprising light emission portions for emitting light according to the voice collecting levels of the microphones.

7. A TV conference apparatus comprising:
- a central tower supported on a base;
- plural monitors that are attached to the central tower with respective arms that are movable so that the monitors are movable between a first state in which the monitors are on a same side of the central tower and directed in a same direction from the central tower and a second state in which the monitors are on respective different sides of the central tower and directed different directions from the central tower;
- a 360° panoramic camera mounted on top of the central tower above tops of the monitors;
- a control unit inside the central tower and connected to and controlling the monitors and the camera; and
- a rotatable body attached to the top of the central tower, one side of said rotatable body having the camera thereon and an opposite side of said rotatable body having a handle thereon that extends above the top of the central tower and is adapted for carrying the TV conference apparatus.

\* \* \* \* \*